United States Patent
Bell et al.

(10) Patent No.: US 9,644,673 B2
(45) Date of Patent: May 9, 2017

(54) BEARING

(71) Applicants: Andrew Bell, Clevedon (GB); Paul Chance, Clevedon (GB); Michael Colton, Bristol (GB); Will Curry, Clevedon (GB)

(72) Inventors: Andrew Bell, Clevedon (GB); Paul Chance, Clevedon (GB); Michael Colton, Bristol (GB); Will Curry, Clevedon (GB)

(73) Assignee: AKTIEBOLAGET SKF, Gothenburg (SE)

( * ) Notice: Subject to any disclaimer, the term of this patent is extended or adjusted under 35 U.S.C. 154(b) by 59 days.

(21) Appl. No.: 14/739,310

(22) Filed: Jun. 15, 2015

(65) Prior Publication Data
US 2015/0362011 A1    Dec. 17, 2015

(30) Foreign Application Priority Data
Jun. 13, 2014    (GB) .................................. 1410555.5

(51) Int. Cl.
F16C 25/02    (2006.01)
F16C 41/00    (2006.01)
F16C 17/24    (2006.01)
F16C 17/26    (2006.01)
F16C 17/02    (2006.01)

(52) U.S. Cl.
CPC .............. *F16C 25/02* (2013.01); *F16C 17/02* (2013.01); *F16C 17/246* (2013.01); *F16C 17/26* (2013.01); *F16C 41/00* (2013.01); *F16C 41/008* (2013.01); *F16C 2226/16* (2013.01)

(58) Field of Classification Search
CPC .......... F16C 25/02; F16C 17/02; F16C 41/00
See application file for complete search history.

(56) References Cited

U.S. PATENT DOCUMENTS

| 2,147,883 | A | * | 2/1939 | Conner | ................... F16C 25/02 384/267 |
| 3,044,798 | A | | 7/1962 | Gerner | |
| 3,701,912 | A | | 10/1972 | Schulze | |
| 5,689,146 | A | | 11/1997 | Cheever | |
| 8,745,875 | B1 | * | 6/2014 | Hagelthorn | ........... F16C 41/008 29/724 |
| 2003/0030565 | A1 | | 2/2003 | Sakatani | |

FOREIGN PATENT DOCUMENTS

| CH | 281535 A | 3/1952 |
| EP | 0285453 A2 | 10/1988 |
| EP | 0332311 A1 | 9/1989 |
| EP | 1347184 A1 | 9/2003 |
| EP | 1369593 A2 | 12/2003 |
| GB | 1290305 A | 9/1972 |
| GB | 1383157 A | 2/1975 |
| GB | 2093131 A | 8/1982 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A bearing assembly comprising: (a) an inner journal for supporting a shaft and having a frusto-conical contact surface facing radially outwardly; (b) an outer journal surrounding at least part of the inner journal and having a frusto-conical contact surface which faces radially inwardly; and (c) an adjustment feature for adjusting the axial location of the inner journal relative to the outer journal.

14 Claims, 4 Drawing Sheets

BEARING

CROSS REFERENCE TO RELATED APPLICATIONS

This is a Non-Provisional Patent Application, filed under the Paris Convention, claims the benefit of Great Britain Patent (GB) Application Number 1410555.5 filed on 13 Jun. 2014, which is incorporated herein by reference in its entirety. The one year anniversary falls on a Saturday, 13 Jun. 2015. Therefore Applicant is afforded until the next business day, Monday, 15 Jun. 2015 for timely submission of the Paris Convention Application into the United States Patent Trademark Office.

TECHNICAL FIELD

The invention relates to a bearing for use in a wide variety of applications. Particularly, but not exclusively, the invention relates to self-lubricated bearings.

BACKGROUND

Flanged bearings are well known. Bearings having conical contact surfaces for supporting both radial and axial loads are also known, such as that disclosed in US 2013/0341458.

As illustrated in FIG. 1, wear of a bearing 20 (shown in cross-section) can cause a clearance 15 to form between a loaded shaft 10 and the surface of the bearing 20. When a bearing 20 with such a clearance 15 is subjected to an oscillating load, peak contact pressures can be much greater than the case in which no clearance 15 is present.

The present invention seeks to tackle at least some of the problems associated with the prior art or at least to provide a commercially acceptable alternative solution thereto.

SUMMARY OF THE PRESENT INVENTION

The present invention provides for a bearing assembly comprising: an inner journal for supporting a shaft and having a frusto-conical contact surface facing radially outwardly; an outer journal surrounding at least part of the inner journal and having a frusto-conical contact surface which faces radially inwardly; and adjustment feature for adjusting the axial location of the inner journal relative to the outer journal.

BRIEF DESCRIPTION OF DRAWINGS

For a better understanding of the invention and to show how the same may be put into effect, reference will now be made, by way of example only, to the appended drawings, in which.

DETAILED DESCRIPTION

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Figure 2:
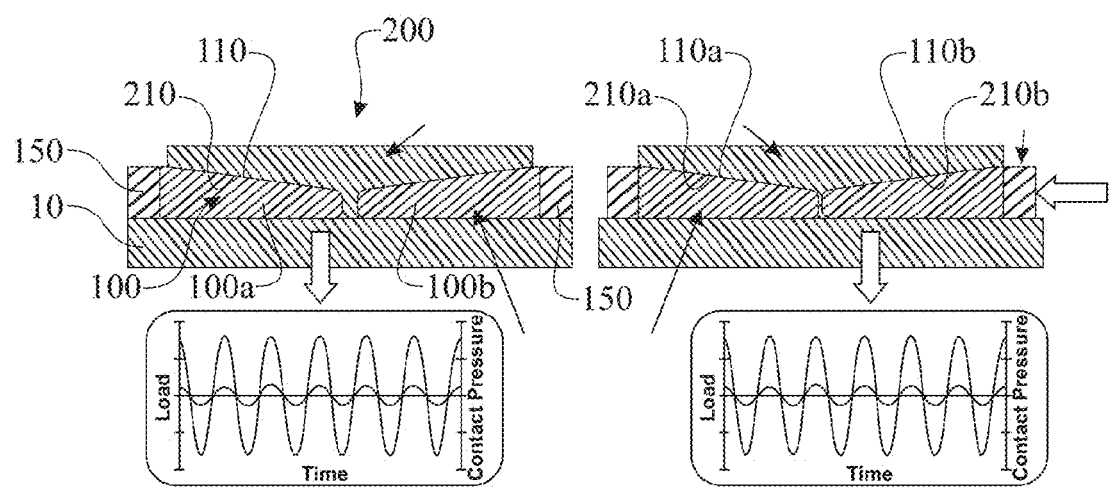
FIG. 2 shows a first embodiment of a bearing in accordance with the invention.

FIG. 2 shows a first embodiment of a bearing assembly. The bearing assembly comprises an inner journal 100 and an outer journal 200. The outer journal 200 surrounds at least part of the inner journal 100.

The journals 100, 200 preferably comprise self-lubricating material.

The inner journal 100 is arranged to be mounted on a shaft 10 and rotate therewith. The outer journal 200 can support other components relative to which the shaft 10 is rotated. For example, the outer journal 200 can support a frame or housing. Thus, friction caused by rotation will be present between the contacting surfaces of the inner journal 100 and the outer journal 200.

The inner journal 100 and the outer journal 200 have opposed and contacting frusto-conical contact surfaces 110, 210. The contact surface 110 of the inner journal 100 contacts the contact surface 120 of the outer journal 200.

The inner journal 100 has a radially outward-facing frusto-conical contact surface 110. The outer journal 200 has a radially inward-facing frusto-conical contact surface 210.

Preferably, and as shown in FIG. 2, the inner and outer journals 100, 200 each have at least two frusto-conical contact surfaces 110, 210.

For example, the inner journal 100 or the outer journal 200 may be arranged to narrow towards its axially outermost ends to form a pair of frusto-conical contact surfaces 110a, 110b, 210a, 210b. The example of FIG. 2 shows this arrangement for the outer journal 200.

In an alternative example, the inner journal 100 or the outer journal 200 may be arranged to widen towards its axially outermost ends to form a pair of frusto-conical contact surfaces 110a, 110b, 210a, 210b. The example of FIG. 2 shows this arrangement for the inner journal 100.

The contact surfaces 110, 210 of one of the inner and outer journals 100, 200 may be arranged to form a substantially triangular cross-section in an axial and radial plane. The contact surfaces 110, 210 of one of the inner and outer journals 100, 200 may be arranged to form a V-shaped cross-section in an axial and radial plane.

One or both of the inner and outer journals 100, 200 are preferably formed from or comprise a self-lubricated material. When only one of the inner and outer journals 100, 200 includes self-lubricating material, the other preferably has a polished contact surface.

One or both of the inner and outer journals 100, 200 may include a layer of self-lubricating material defining the contact surfaces 110, 210. It is unimportant whether the self-lubricated journal is the adjustable journal.

One or both of the inner journal 100 and the outer journal 200 may comprise two or more parts 100a, 100b, 200a, 200b, with one frusto-conical contact surface 110a, 110b, 210a, 210b formed on each of the two parts. Such parts may be generally ring-shaped. The example of FIG. 2 shows the inner journal 100 comprising two parts, which may slide axially relative to one another.

Figure 3:
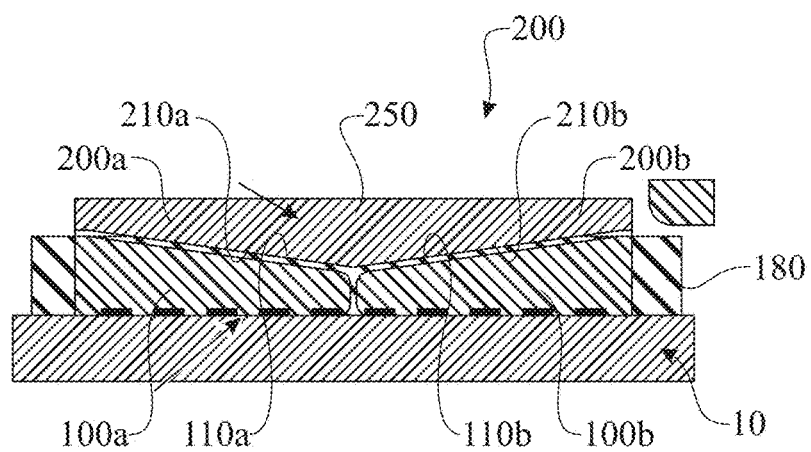
FIG. 3 shows a second embodiment of a bearing in accordance with the invention.

Similarly, the example of FIG. 3 shows the outer journal 200 may comprise: two parts having frusto-conical surfaces 210a, 210b; and a ring 250 of elastic material located therebetween. In alternative embodiments, the ring 250 may be a separate entity or may be integrally formed with the two parts. Similarly, an outer journal 200 may be used with an inner journal 100 in which the two parts 100a, 100b are joined to form a single body with a V-shaped cross-section.

An indicator may be provided to show how far apart the two parts 200a, 200b have moved from their initial position. For example, each of the two parts 200a, 200b may be marked, and the axial distance between the markings will vary as one or both of the journals 100, 200 wear.

In use, the shaft 10 rotates relative to a housing or other component (not shown). The inner journal 100 is mounted on the shaft so as to rotate therewith. The outer journal 200 is mounted on the housing or other component so as to rotate therewith, relative to the shaft 10. Thus, friction is developed between the contact surfaces 110, 210.

After extended use and under transverse loading, wear of the inner and/or outer journals 100, 200 in the radial direction is likely to occur. Undesirably, this can lead to a clearance between opposing contact surfaces 110, 210.

The inventors have realized that owing to the frusto-conical shape of the contact surfaces 110, 210, the clearance between the inner and outer journals 100, 200, whilst formed by wear in the radial direction, may be taken up by adjusting the frusto-conical contact surfaces 110, 210 in the axial direction.

This is demonstrated in FIG. 2, in which wear imposed on the inner and/or outer journal 100, 200 from the initial position shown in the left half of FIG. 2 is taken up by moving the two inner journal 100 parts towards one another until the clearance is taken up as shown in the right half of FIG. 2.

Figure 1:
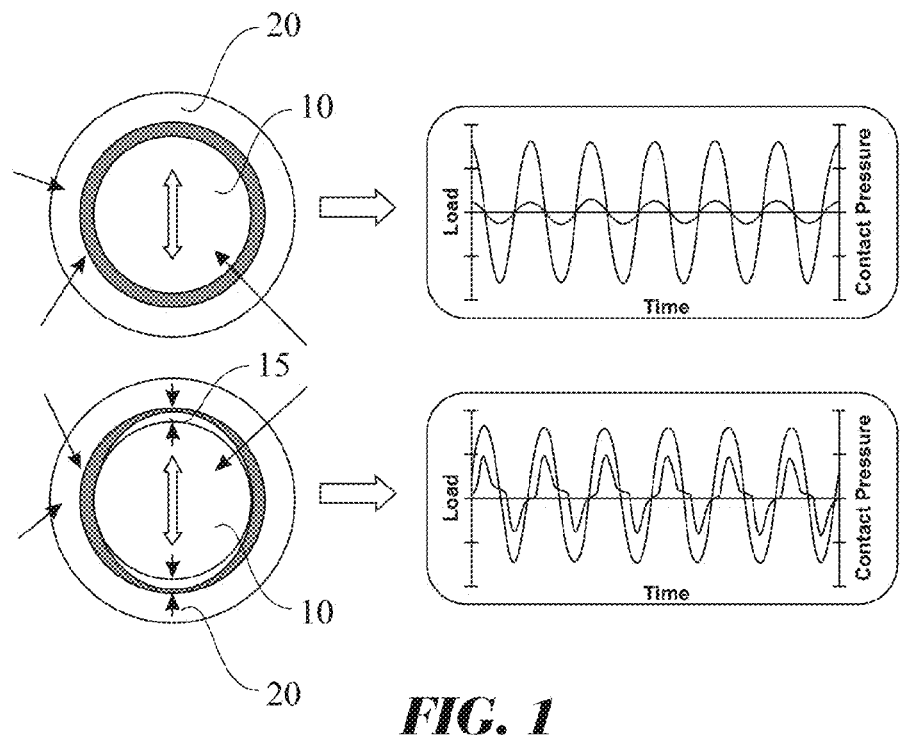
FIG. 1 schematically represents the problems of a clearance formed between a loaded shaft and a bearing surface when subjected to oscillating loading.

Such adjustment of the inner and/or outer journals 100, 200 can reduce the consequences of journal wear, avoiding the situation depicted in FIG. 1 for a longer period of time, and thus extend the useful life of the bearing.

Moreover, the rate of wear of the journals 100, 200 is reduced, because the peak contact pressures are reduced by taking up the clearance (thus avoiding the situation shown in FIG. 1) thereby prolonging life of the bearing further.

Figure 5:
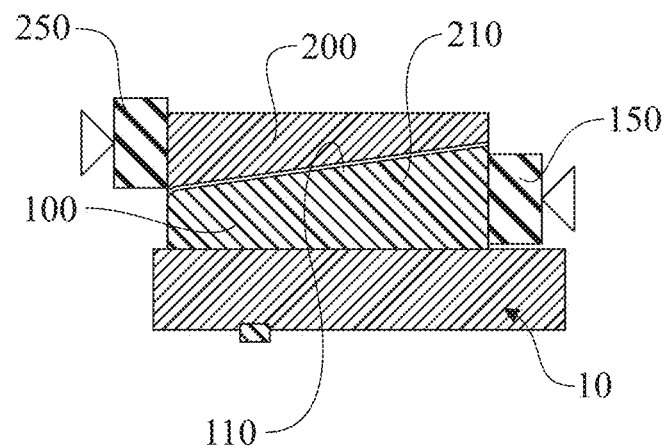
FIG. 5 shows an alternative embodiment of a bearing.

As will be appreciated, this adjustment may be applied to a bearing having only a single frusto-conical contact 110, 210 surface on each of the inner and outer journals 100, 200 as shown in FIG. 5.

When a journal 100, 200 has two parts that taper/narrow towards each other in the axial direction, the adjustment may be made by moving the frusto-conical surfaces 110a, 110b, 210a, 210b towards each other.

Conversely, when a journal 100, 200 has two parts that taper/narrow away from each other in the axial direction, the adjustment may be made by moving the frusto-conical surfaces 110a, 110b, 210a, 210b further apart.

Such parts may form all or just part of the inner journal 100 or the outer journal 200.

Adjustment means 150 for adjusting the axial location of the parts of the inner journal 100 relative to the outer journal 200 is shown in FIG. 2.

Figure 4:
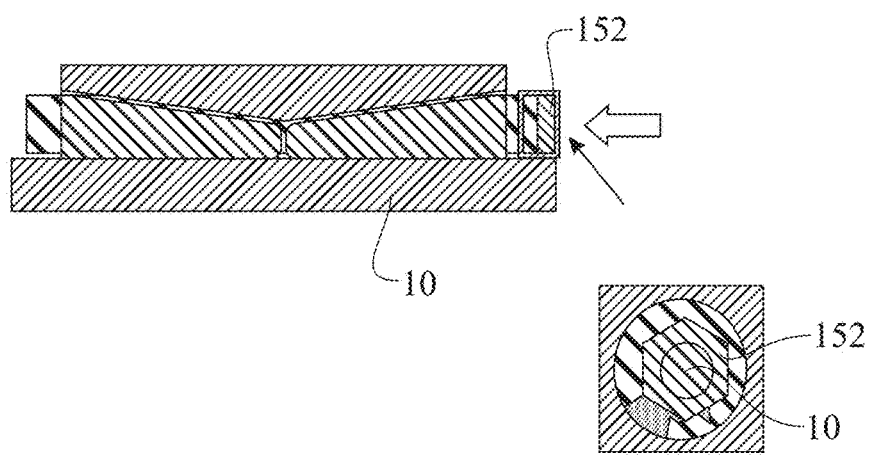
FIG. 4 shows a preferred variant of the first embodiment.

As shown in FIG. 4, a preferred adjustment feature 150 may adjust the axial location of components of the inner member 100 along the shaft 10. Such adjustment feature 150 may comprise an axially positionable member 152, such as a threaded member (e.g. a nut) engaging a thread on the shaft 10 or on a collar mounted on the shaft 10. Rotation of the threaded member 152 may translate it axially to abut and thereby move the frusto-conical part of the inner journal 100.

An alternative axially positionable member 152 may be a ratchet. Such a ratchet may be arranged to allow axial translation of a frusto-conical contact surface 110, 210 in one direction only.

In some embodiments, the adjustment mechanism may include an opposing abutment, which may also be axially positionable member (which can allow accurate the bearing to be accurately centered) or may be axially fixed.

Advantageously, the adjustment feature 150 may be arranged (e.g. may be marked, or may cover a marking) to indicate the amount of movement of the inner journal 100 relative to the outer journal 200 (e.g. movement from their respective initial positions), and thereby indicate an amount of wear of the contact surfaces 110, 210.

For example, the amount of axial movement of an axially positionable member 152 can indicate an amount of wear of the contact surfaces 110, 210.

Similarly, the amount of rotation of a threaded member can indicate an amount of wear of the contact surfaces 110, 210.

Figure 7:
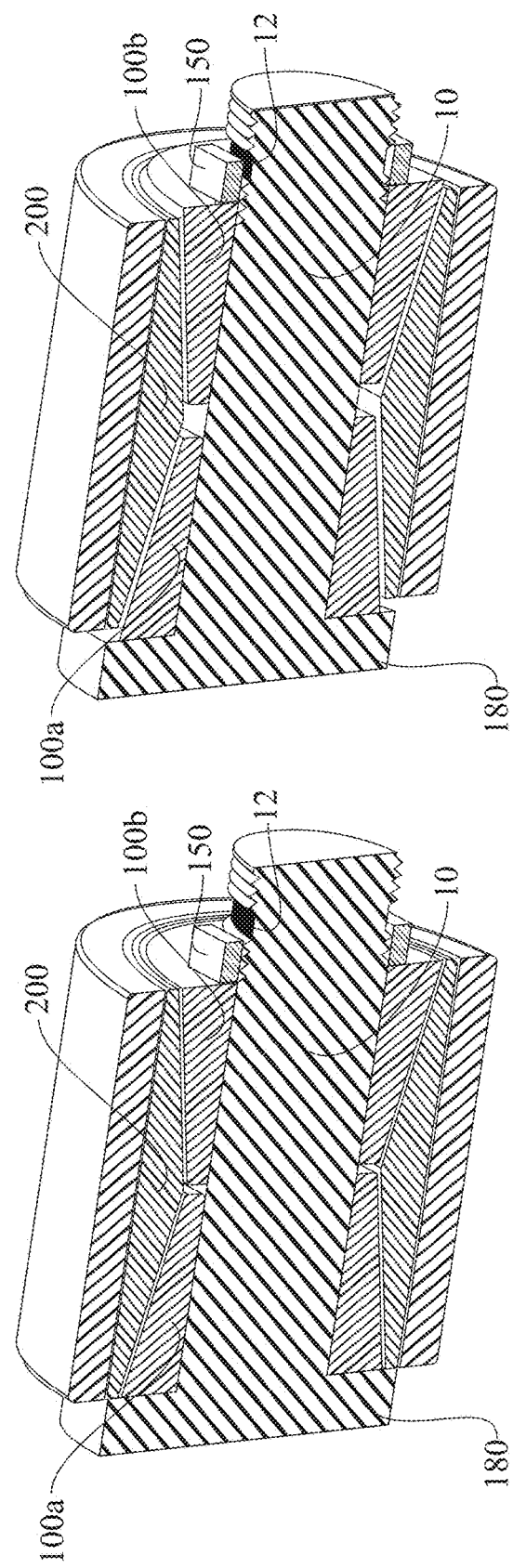
FIG. 7 shows a cut-away perspective view demonstrating a preferred indicator for indicating an amount of wear of the journals.

FIG. 7 shows two images demonstrating the axial movement of inner and outer journal components (in this case components 100b and 200, since component 100a abuts a fixed abutment 180) following adjustment using adjustment feature 150. In the initial position (the right-hand image), the adjustment feature 150 conceals a marking on the shaft 10. As the inner and/or outer journals 100a, 100b, 200 wear, the clearance may be taken up by adjusting the adjustment feature 150 (e.g. rotating a bolt to axially translate along a threaded portion of the shaft 10). This adjustment moves one part 100b of the inner journal 100, and the outer journal 200, axially to take up the clearance. Advantageously, translation of the adjustment feature 150 uncovers an indicator 12, which may be located on the shaft 10. In this way, when the indicator is fully uncovered, a user may choose to replace the bearing assembly.

An alternative means for indicating an amount of axial movement may be provided electronically.

In such an embodiment, electronic means for measuring axial displacement may be used to measure the relative axial movement of the parts of the inner and outer journals 100, 200. For example, a strain gauge may be applied across the adjusted journal to measure movement.

This can allow wear to be monitored without disassembly of the device in which the bearing assembly is used. Such means for measuring axial displacement may preferably be arranged to provide a wireless signal.

In the alternative embodiment of FIG. 3, the adjustment feature 250 for adjusting the axial location of the parts of the outer journal 200 relative to the inner journal 100 is shown. In this example, a ring 250 of elastic material may be located between the two separate rings 200a, 200b to collectively form part or all of the outer journal 200.

The rings 200a, 200b and the ring 250 may be separate entities or may be adjoined or formed integrally.

In the unworn state of the bearing, the ring 250 may be compressed so as to bias the two parts 200a, 200b outwardly. As the journals 100, 200 wear, the two parts 200a, 200b of the outer journal 200 are free to slide axially apart under the force of the compressed ring 250, and thereby take up the clearance.

For ease of manufacture, it is preferable for the inner journal 100 to be made of two separate parts. In which case, abutments 180 that cannot move axially along the shaft may be provided to prevent outward motion of the parts of the inner journal 100.

A further arrangement is shown in FIG. 5. The inner journal 100 of this embodiment has only a single frusto-conical contact surface 110 and the outer journal 200 has only a single frusto-conical contact surface 210. However, as can be seen from the Figure, axial adjustment can remove any clearance between the contact surfaces 110, 210. The inner journal 100 can be adjusted by adjustment feature 150 and/or the outer journal 200 can be adjusted by adjustment feature 250.

Figure 6:
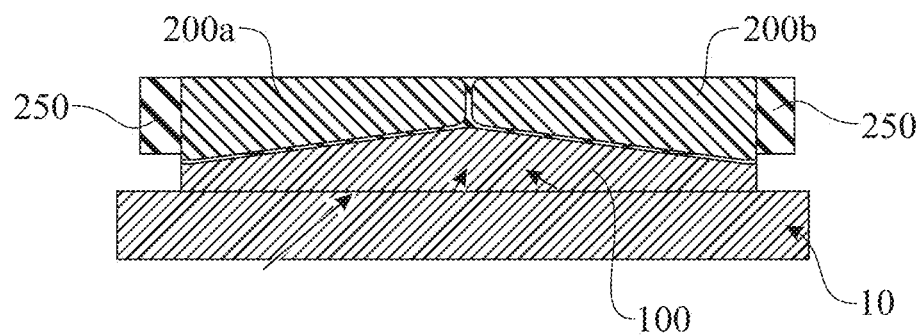
FIG. 6 shows an alternative embodiment of a bearing.

FIG. 6 illustrates how the inner and outer journals 100, 200 may be arranged in the opposite manner from FIG. 1. In the depicted arrangement, the inner journal 100 may, optionally, comprise a compressive ring of material separating two parts. Alternatively, the inner journal 100 may simply be a solid piece of material having a substantially triangular cross-section.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A bearing assembly comprising:
    an inner journal, wherein the inner journal supports a shaft, and wherein the inner journal comprises a frusto-conical contact surface facing radially outwardly;
    an outer journal, wherein the outer journal surrounds at least part of the inner journal, and wherein the outer journal comprises a frusto-conical contact surface which faces radially inwardly; and
    an adjustment feature configured to adjust an axial location of the inner journal relative to the outer journal, wherein the adjustment feature comprises interlocking threaded members; and
    an indicator configured to identify an amount of rotation of at least one of the interlocking threaded members.

2. The bearing assembly of claim 1, wherein the adjustment feature comprises an axially positionable member arranged to abut one of an inner member and an outer member.

3. The bearing assembly of claim 1, wherein the adjustment feature further comprises at least one of:
    a spring;
    a compressible material; and
    a ratchet.

4. The bearing assembly of claim 1, further comprising a feature that indicates an amount of relative axial movement between the inner and outer journal.

5. The bearing assembly of claim 1, wherein:
    at least one of the inner journal and the outer journal comprises two rings, each ring of the two rings having a frusto-conical contact surface.

6. The bearing assembly of claim 5, wherein the two rings are oriented such that their narrowest ends face each other.

7. The bearing assembly of claim 6, wherein the adjustment feature further comprises at least one of:
    a compressible material;
    a spring; and
    a ratchet,
    wherein the adjustment feature is located either side the two rings to prevent the two rings from moving apart.

8. The bearing assembly of claim 5, wherein:
    the two rings are oriented such that their widest ends face towards each other.

9. The bearing assembly of claim 8, wherein the adjustment feature comprises a biasing element, wherein the biasing element is at least one of:
    a spring; and
    a compressible material,
    wherein the biasing element is located between the two rings to bias the two rings apart.

10. The bearing assembly of claim 5, further comprising a feature that indicates an amount of relative axial movement between the two rings.

11. The bearing assembly of claim 10, wherein the feature is an electronic device.

12. The bearing assembly of claim 11, wherein the electronic device provides a wireless signal.

13. A method of maintaining a bearing comprising an adjustment feature, an indicator, an inner journal and an outer journal,
    wherein the inner journal supports a shaft,
    wherein the inner journal comprises a frusto-conical contact surface facing radially outwardly,
    wherein the outer journal surrounds at least part of the inner journal,
    wherein the outer journal comprises a frusto-conical contact surface which faces radially inwardly,
    wherein the adjustment feature comprises interlocking threaded members,
    the method comprising:
    varying an axial location of the inner journal relative to the outer journal until the frusto-conical contact surfaces abut; and
    identifying, by the indicator, an amount of rotation of at least one of the interlocking threaded members.

14. The method of claim 13, further comprising electronically monitoring an axial movement of the inner journal relative to the outer journal.

* * * * *